United States Patent
Chang et al.

(10) Patent No.: US 12,403,741 B2
(45) Date of Patent: Sep. 2, 2025

(54) VEHICLE HEIGHT CONTROL SYSTEM

(71) Applicants: Hyundai Motor Company, Seoul (KR); Kia Corporation, Seoul (KR)

(72) Inventors: Sehyun Chang, Suwon-Si (KR); Youngil Sohn, Yongin-Si (KR); Jun Ho Seong, Seoul (KR); Woo Keun Park, Seongnam-Si (KR); Min Jun Kim, Busan (KR); Sang Woo Hwang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/526,651

(22) Filed: Dec. 1, 2023

(65) Prior Publication Data

US 2024/0300274 A1 Sep. 12, 2024

(30) Foreign Application Priority Data

Mar. 6, 2023 (KR) ........................ 10-2023-0028900

(51) Int. Cl.
*B60G 17/0165* (2006.01)

(52) U.S. Cl.
CPC ...... *B60G 17/0165* (2013.01); *B60G 2200/14* (2013.01); *B60G 2204/418* (2013.01); *B60G 2204/4191* (2013.01); *B60G 2500/30* (2013.01); *B60G 2600/182* (2013.01); *B60G 2800/012* (2013.01)

(58) Field of Classification Search
CPC ................................................. B60G 17/0165
See application file for complete search history.

(56) References Cited

U.S. PATENT DOCUMENTS

| 4,540,197 A * | 9/1985 | Finn .......................... F16F 1/26 |
| | | 280/124.167 |
| 6,671,596 B2 * | 12/2003 | Kawashima ........... B60G 7/006 |
| | | 280/5.515 |
| 10,703,199 B2 * | 7/2020 | Gruschow ................ B60G 3/04 |

(Continued)

FOREIGN PATENT DOCUMENTS

| CA | 3050623 A1 * | 7/2018 | .......... B60G 15/068 |
| CN | 204506399 U * | 7/2015 | |

(Continued)

OTHER PUBLICATIONS

C. Lee and S. Oh, "Configuration and performance analysis of a compact planetary geared Elastic Actuator," IECON 2016—42nd Annual Conference of the IEEE Industrial Electronics Society, 2016, pp. 6391-6396.

(Continued)

*Primary Examiner* — Nicole T Verley
(74) *Attorney, Agent, or Firm* — Morgan Lewis & Bockius LLP

(57) ABSTRACT

A vehicle height control system includes an arm including a first end portion connected to a vehicle body and a second end portion coupled to a wheel, a bearing unit fixed to the vehicle body, a crank coupled to the bearing unit, a push rod including a first end portion connected to the crank and a second end portion connected to the arm, and a spring reaction force variable device coupled to the bearing unit and configured to vary reaction force applied to the crank.

18 Claims, 8 Drawing Sheets

(56) References Cited

U.S. PATENT DOCUMENTS

| | | | | |
|---|---|---|---|---|
| 2005/0275181 | A1* | 12/2005 | MacIsaac | B62D 39/00 |
| | | | | 180/271 |
| 2015/0111489 | A1 | 4/2015 | Chopra | |
| 2018/0224020 | A1 | 8/2018 | Ohashi | |
| 2021/0293293 | A1 | 9/2021 | Krause | |
| 2024/0100898 | A1* | 3/2024 | Chang | B60G 3/18 |

FOREIGN PATENT DOCUMENTS

| | | | | |
|---|---|---|---|---|
| CN | 111417530 B * | 3/2023 | | B60G 11/107 |
| DE | 102010033002 A1 * | 2/2012 | | B60G 11/183 |
| DE | 102013002713 B4 * | 8/2014 | | B60G 11/15 |
| DE | 102013012637 A1 * | 1/2015 | | B60G 11/50 |
| DE | 102016213195 A1 * | 1/2018 | | |
| EP | 1698495 A2 * | 9/2006 | | B60G 11/181 |
| EP | 2228240 A2 * | 9/2010 | | B60G 11/16 |
| EP | 1894756 A2 * | 3/2018 | | B60G 17/0162 |
| GB | 2468487 A * | 9/2010 | | B60G 11/16 |
| JP | H 08-178119 A | 7/1996 | | |
| JP | 2846413 B2 * | 1/1999 | | |
| JP | 2009132237 A * | 6/2009 | | B60G 17/0157 |
| JP | 2016-023684 A | 2/2016 | | |
| JP | 2024165846 A * | 11/2024 | | |
| KR | 2000-0055777 A | 9/2000 | | |
| KR | 20020052281 A * | 7/2002 | | |
| KR | 2006-0112245 A | 10/2006 | | |
| KR | 20070060480 A * | 6/2007 | | |
| KR | 10-1339218 B | 1/2014 | | |
| KR | 10-2379149 B | 3/2022 | | |
| KR | 2022-0096698 A | 7/2022 | | |
| WO | WO-2014124721 A1 * | 8/2014 | | B60G 11/181 |
| WO | WO-2015010773 A1 * | 1/2015 | | B60G 11/50 |
| WO | WO-2017079263 A1 * | 5/2017 | | B60G 3/04 |
| WO | WO-2019177486 A1 * | 9/2019 | | B60G 17/08 |
| WO | WO-2021240415 A1 * | 12/2021 | | B60G 13/14 |

OTHER PUBLICATIONS

Lee, C.; Kwak, S.; Kwak, J.; Oh, S. Generalization of Series Elastic Actuator Configurations and Dynamic Behavior Comparison. Actuators 2017, 6, 26.

Arnaldo Gomes Leal Junior, et al., "Series Elastic Actuator: Design, Analysis and Comparison" Chapter 10, 2016.

* cited by examiner

APPLICATION OF MOTOR INPUT TORQUE

CLUTCH IS FIXED
(MOTOR INPUT TORQUE REMOVED)

SURFACES ARE
JOINED TOGETHER

⟵ : TENSION

VEHICLE HEIGHT CONTROL SYSTEM

CROSS-REFERENCE TO RELATED APPLICATION

The present application claims priority to Korean Patent Application No. 10-2023-0028900, filed on Mar. 6, 2023, the entire contents of which is incorporated herein for all purposes by this reference.

BACKGROUND OF THE PRESENT DISCLOSURE

Field of the Present Disclosure

The present disclosure relates to a vehicle height control system. More particularly, it relates to a vehicle height control system capable of controlling vehicle height and roll behavior of a vehicle by controlling input torque of a separate spring reaction force variable device depending on the load state of the vehicle.

Description of Related Art

Generally, a vehicle and a means of transportation use a suspension including a spring device having elastic force and a damper device having absorbing force, and the suspension serves as a device configured to maintain vehicle height, which is the vertical distance of the highest point of the vehicle from the ground plane, to support the weight of the vehicle, and to mitigate the impact the vehicle receives from the ground.

When a vehicle having a high center of gravity, such as a large bus or a double-decker bus, is traveling on the road, overturning of the vehicle may occur due to a rapid rolling motion caused by sudden steering. To reduce the risk of such an accident, it is required not only to change damping force of the suspension but also to adjust vehicle height by lowering a vehicle body.

On the other hand, when a vehicle having low vehicle height is traveling on the road, the lower side of a vehicle body or a bumper may contact with a speed bump or a protruding portion on the road surface. Therefore, a vehicle height adjustment device configured to adjust the vehicle height is provided in a vehicle having low vehicle height. The vehicle height adjustment device controls the vehicle height by driving a motor. However, generally, because power is continuously supplied to the motor to prevent back drive of the motor after vehicle height adjustment is performed by the vehicle height adjustment device, energy consumption of the vehicle may increase. Accordingly, it is necessary to solve a problem related to energy consumption.

Meanwhile, the vehicle height adjustment device, generally, adjusts, depending on the load state of a vehicle occupant or baggage, the vehicle height within the range of load conditions of curb weight and gross vehicle weight (GVW). That is, a change in adjustable payload is limited. Recently, as types of vehicles become more diverse, a purpose built vehicle (refer to hereinafter as PBV) has emerged on the market. In the case of a detachable transporter among PBVs, when a business box (a main body) is detached from the transporter in the forward-and-rearward direction, there is a significant difference between a payload to be supported when the transporter exists independently and a payload to be supported when the same has the business box attached thereto. Therefore, there is a need for a technique capable of controlling the vehicle height depending on a much wider range of vehicle load states.

Meanwhile, while a vehicle is traveling on the road, vibrations such as rolling, pitching, and yawing occur in addition to vertical bouncing of the vehicle body. In the instant case, a suspension system is used to reliably absorb these vibrations to improve ride comfort as well as steering stability. Among the vibrations, the movement of the vehicle body from side to side is referred to as rolling, and when the present rolling occurs, ride comfort and driving stability of the vehicle may deteriorate and deformation of the vehicle body may occur. For the present reason, the suspension system of the vehicle is provided with a device configured to prevent rolling of the vehicle body.

For example, the suspension system includes a stabilizer bar configured to prevent a vehicle from shaking from side to side and to maintain parallelism of a vehicle body. Here, the stabilizer bar controls roll behavior of a vehicle by torsion generated by a phase difference between a bump stroke and a rebound stroke of a left or right wheel of the vehicle. However, such a vehicle roll control device has a limitation in controlling roll behavior generated by active movement of a vehicle due to a characteristic of the stabilizer bar configured to control roll behavior of a vehicle. Accordingly, there is a problem in that it is impossible to provide both stability and ride comfort of a vehicle only using a stabilizer bar including a fixed rigidity.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle height control system configured for controlling vehicle height and roll behavior of a vehicle by controlling input torque of a separate spring reaction force variable device depending on the load state of the vehicle.

Furthermore, various aspects of the present disclosure are directed to providing a vehicle height control system configured for maintaining vehicle height in a state in which continuous driving force of a motor is not applied through a clutch unit located in a spring reaction force variable device.

The objects of the present disclosure are not limited to the above-mentioned objects, and other technical objects not mentioned herein will be clearly understood by those skilled in the art from the detailed description of the embodiments. Furthermore, the objects of the present disclosure may be achieved by means indicated in the scope of the claims and a combination thereof.

Various aspects of the present disclosure are directed to providing a vehicle height control system including an arm including a first end portion connected to a vehicle body and a second end portion coupled to a wheel, a bearing unit fixed to the vehicle body, a crank coupled to the bearing unit, a push rod including a first end portion connected to the crank and a second end portion connected to the arm, and a spring reaction force variable device coupled to the bearing unit and configured to vary reaction force applied to the crank.

In an exemplary embodiment of the present disclosure, the spring reaction force variable device may further include a motor configured to provide torque, a clutch unit connected to an output shaft of the motor, a reducer located at an output end portion of the clutch unit and coupled to the crank, and a spring portion coupled to the reducer. Reaction torque of the spring portion may be varied by driving the motor.

In another exemplary embodiment of the present disclosure, in the spring reaction force variable device, when the motor is driven, motor torque may be applied to the reducer coupled to the output end portion so that the motor torque on the reducer, the reaction torque of the spring portion, and load torque by an external load applied to the reducer through the crank are balance, and when the motor is not driven, the reaction torque and the load torque may be in balance.

In various exemplary embodiments of the present disclosure, the clutch unit may rotate only when the torque is input through the output shaft of the motor.

In various exemplary embodiments of the present disclosure, the reducer may be formed of a planetary gear set, and the planetary gear set may include a sun gear coupled to the output end portion of the clutch unit, a ring gear fixed to the spring portion, a plurality of planetary gears located and engaged between the sun gear and the ring gear, and a carrier including a first end portion connected to the planetary gears and a second end portion connected to the bearing unit.

In still various exemplary embodiments of the present disclosure, the spring portion may further include a frame fixed to the vehicle body, an elastic portion including one end portion fixed to the frame, and a ring gear fixing portion including the other end portion of the elastic portion fixed thereto, the ring gear fixing portion being coupled to the ring gear.

In a further exemplary embodiment of the present disclosure, the elastic portion may include a first elastic portion located adjacent to the frame and a second elastic portion located adjacent to the ring gear.

In another further exemplary embodiment of the present disclosure, the bearing unit may include a bearing case fixed to the vehicle body, a rod portion formed to be integrated with the crank and supported by the bearing case, a spring coupling portion located at one end portion of the rod portion and coupled to a torsion spring, and a variable device coupling portion located at the other end portion of the rod portion and coupled to the spring reaction force variable device.

In yet another further exemplary embodiment of the present disclosure, the bearing case may further include a support bearing configured to rotatably support the rod portion.

In yet another further exemplary embodiment of the present disclosure, the torsion spring and the spring coupling portion may be coupled to each other through a tooth-meshing structure or a bolt fastening structure.

In still yet another further exemplary embodiment of the present disclosure, an output end portion of the spring reaction force variable device and the variable device coupling portion may be coupled to each other through a tooth-meshing structure or a bolt fastening structure.

Various aspects of the present disclosure are directed to providing a vehicle height control system including an arm including a first end portion connected to a vehicle body and a second end portion coupled to a wheel, a bearing unit fixed to the vehicle body, a crank coupled to the bearing unit, a push rod including a first end portion connected to the crank and a second end portion connected to the arm, a spring reaction force variable device coupled to the bearing unit and configured to vary reaction force applied to the crank, and a control unit configured to perform, when a measured vehicle height exceeds a preset vehicle height range, driving of the spring reaction force variable device.

In an exemplary embodiment of the present disclosure, the spring reaction force variable device may further include a motor configured to provide torque, a clutch unit connected to an output shaft of the motor, a reducer located at an output end portion of the clutch unit and coupled to the crank, and a spring portion coupled to the reducer. Reaction torque of the spring portion may be varied by driving the motor.

In another exemplary embodiment of the present disclosure, the control unit may perform driving of the motor when the measured vehicle height exceeds the preset vehicle height range.

In various exemplary embodiments of the present disclosure, the control unit may be configured to determine an amount of change in the vehicle height according to each driving of the motor, and to set the number of times of the driving of the motor based on the determined amount of change in the vehicle height.

In various exemplary embodiments of the present disclosure, the reducer may be formed of a planetary gear set, and the planetary gear set may include a sun gear coupled to the output end portion of the clutch unit, a ring gear fixed to the spring portion, a plurality of planetary gears located to move between the sun gear and the ring gear, and a carrier including a first end portion connected to the planetary gears and a second end portion connected to the bearing unit.

In still various exemplary embodiments of the present disclosure, the control unit may convert a target control amount of the vehicle height into a target rotation amount of the carrier and may drive the motor so that the carrier is rotated up to a target location.

In a further exemplary embodiment of the present disclosure, the bearing unit may include a bearing case fixed to the vehicle body, a rod portion formed to be integrated with the crank and supported by the bearing case, a spring coupling portion located at one end portion of the rod portion and coupled to a torsion spring, and a variable device coupling portion located at the other end portion of the rod portion and coupled to the spring reaction force variable device.

Other aspects and exemplary embodiments of the present disclosure are discussed infra.

It is understood that the terms "vehicle", "vehicular", and other similar terms as used herein are inclusive of motor vehicles in general, such as passenger vehicles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
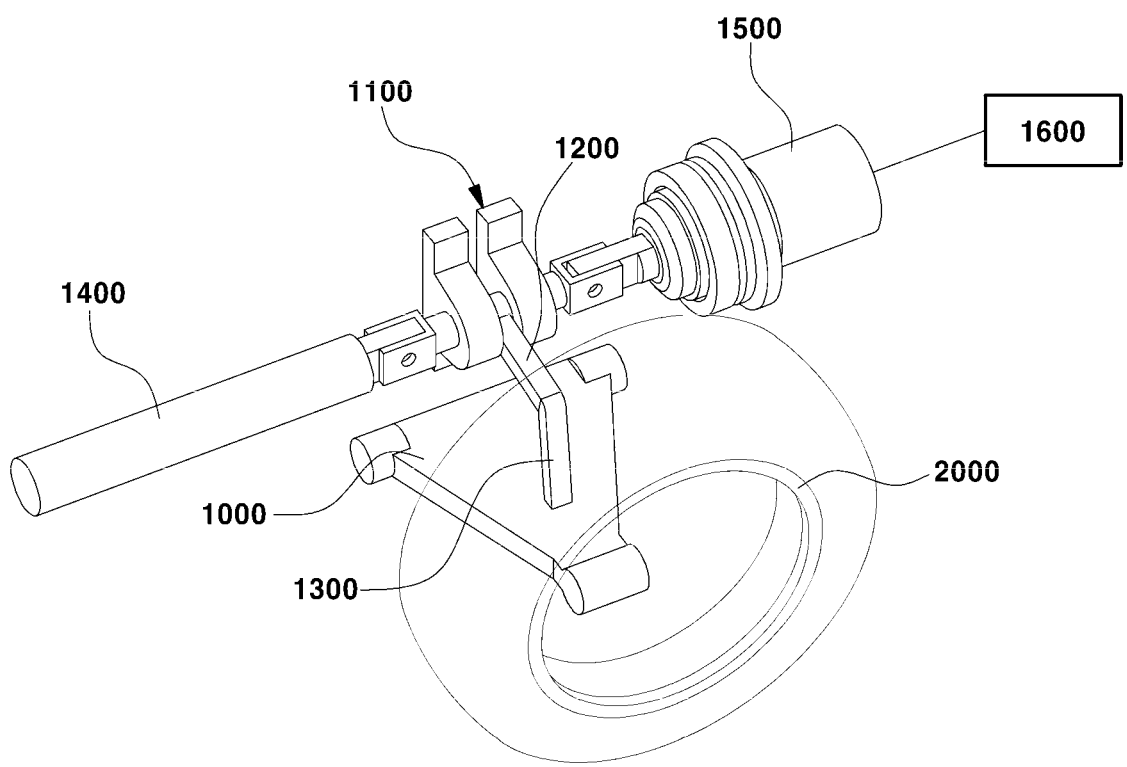
FIG. 1 is a perspective view exemplarily illustrating a vehicle height control system according to various exemplary embodiments of the present disclosure.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent portions of the present disclosure throughout the several figures of the drawing.

DETAILED DESCRIPTION

Hereinafter, reference will be made in detail to various embodiments of the present disclosure, examples of which are illustrated in the accompanying drawings and described below. While the present disclosure will be described in conjunction with exemplary embodiments of the present disclosure, it will be understood that present description is not intended to limit the present disclosure to the exemplary embodiments of the present disclosure. On the other hand, the present disclosure is directed to cover not only the exemplary embodiments of the present disclosure, but also various alternatives, modifications, equivalents, and other embodiments, which may be included within the spirit and scope of the present disclosure as defined by the appended claims. The exemplary embodiments are provided to more completely describe the present disclosure to those skilled in the art.

Furthermore, terms such as "part" and "unit" described in the specification refer to a unit configured to process at least one function or operation, and the unit may be implemented by hardware or a combination of pieces of hardware.

Furthermore, in the present specification, when it is said that any part is positioned "on" or "above" another part, it means that the part is "directly on" the other part. In the instant case, another part may be positioned between the two parts. Furthermore, when it is said that any part is positioned "under" or "below" another part, it means that the part is "directly under" the other part. In the instant case as well, another part may be positioned between the two parts.

Furthermore, a control unit 1600 of the present specification may be implemented by an algorithm configured to control the operation of various components disposed in a vehicle, a memory configured to store data about a program that reproduces the algorithm, and a processor configured to perform the above-described operation using data stored in the memory. In the instant case, the memory and the processor may be implemented as separate chips. Alternatively, the memory and the processor may be implemented as a single chip. For example, the control unit 1600 may include at least one of an electronic control unit (ECU), a central processing unit (CPU), a microprocessor unit (MPU), a microcontroller unit (MCU), an application processor (AP), or any type of processor well known in the technical field of the present disclosure. Furthermore, the control unit 1600 may include at least one application configured to execute a method according to the exemplary embodiments of the present disclosure, or the same may be formed of a combination of software and hardware configured for performing an arithmetic operation on a program.

Furthermore, in each step, an identification code is used for convenience of description, and the identification code does not describe the order of each step. Each step may be performed in a different order from the order described in the exemplary embodiments unless a specific order is explicitly stated in the context.

Additionally, in the following embodiments, a reducer may be described with substantially the same configuration as a planetary gear set, and may be interpreted as including the planetary gear set as a type of reducer.

Furthermore, a wheel 2000 of a vehicle is described in the exemplary embodiment of the present disclosure, and each wheel 2000 of a multi-wheeled vehicle may move independently.

Furthermore, "height" included in the exemplary embodiment of the present disclosure may mean a distance between the center portion of the wheel 2000 and a vehicle body.

Various embodiments of the present disclosure relate to a vehicle height control system, and more particularly to a system configured for controlling the height of a vehicle body by controlling torque applied to a crank 1200 in response to torque of a motor 1510 located in a spring reaction force variable device 1500.

FIG. 1 is a diagram illustrating a configuration of a vehicle height control system according to various exemplary embodiments of the present disclosure.

As illustrated in the drawing, the vehicle height control system includes an arm 1000 including one end portion fixed to a vehicle body and the other end portion coupled to the wheel 2000. Here, the arm 1000 is coupled to the wheel 2000 through a knuckle, and the other end portion of the arm 1000 coupled to the wheel 2000 is configured to move in the vertical direction with respect to the one end portion coupled to the vehicle body.

Furthermore, the arm 1000 includes a bearing unit 1100 fixed to the vehicle body and the crank 1200 located in a direction perpendicular to the longitudinal direction of a rod portion 1120 formed in the bearing unit 1100. The bearing unit 1100 includes a torsion spring 1400 and the spring reaction force variable device 1500 respectively coupled to the opposite end portions of the rod portion 1120. A spring coupling portion 1130 and a variable device coupling portion 1140 are respectively disposed at the opposite end portions of the rod portion 1120 of the bearing unit 1100, and the torsion spring 1400 and the spring reaction force variable device 1500 are respectively coupled to the spring coupling portion 1130 and the variable device coupling portion 1140. The rod portion 1120 is located through a bearing case 1110 of the bearing unit 1100. The crank 1200 is formed to be integrated with the rod portion 1120 and is located in the bearing case 1110. Furthermore, the bearing case 1110 may further include a support bearing 1121 configured to be rotatable through the rod portion 1120. The support bearing 1121 is fixed to the vehicle body so that the rod portion 1120 rotates freely.

The vehicle height control system includes a push rod 1300 located between the end portion of the crank 1200 and the end portion of the arm 1000. The push rod 1300 is configured to move integrally with the end portion of the crank 1200 in response to the vertical movement of the arm 1000. Furthermore, torque applied to the crank 1200 is transmitted to the rod portion 1120 according to the movement direction of the arm 1000. The opposite end portions of the push rod 1300 are respectively coupled to the crank 1200 and the arm 1000 through a bearing, and the push rod 1300 is configured to move integrally with the arm 1000 in the vertical direction thereof. That is, when a change in vehicle height is applied, a torque is applied to the torsion spring 1400 and the spring reaction force variable device 1500 through the crank 1200, and torque is applied to the crank 1200 in response to driving of the spring reaction force variable device 1500, adjusting the vehicle height.

When the currently measured vehicle height via sensors exceeds a vehicle height range preset in the control unit 1600, the control unit 1600 is configured to drive the motor 1510 to apply torque to the crank 1200 so that the vehicle height is adjusted, and to control a driving amount of the motor 1510 so that the vehicle height is adjusted within the preset vehicle height range.

The control unit 1600 may set a driving frequency of the motor 1510 so that the current vehicle height is controlled to be adjusted within the vehicle height range set in the control unit 1600. That is, driving of the motor 1510 may be performed a plurality of times in response to a change in vehicle height which is variable in response to each driving of the motor 1510.

A torque balance relationship of the spring reaction force variable device 1500 according to driving of the motor 1510 is included in FIG. 4C below, and a torque balance relationship of the spring reaction force variable device 1500 after driving of the motor 1510 stops is included in FIG. 4D. According to the torque balance relationships included in FIGS. 4C and 4D, each torque balance relationship is newly set depending on the driving frequency of the motor 1510.

The spring reaction force variable device 1500 coupled to the other side of the bearing unit 1100 is configured to rotate a carrier 1525 of the spring reaction force variable device 1500 by driving force of the motor 1510. The driving force of the motor 1510 is converted into reaction torque of the carrier 1525 of the spring reaction force variable device 1500, and the reaction torque is transmitted to the crank 1200 directly coupled to the rod portion 1120 of the bearing unit 1100. The variable device coupling end portion of the bearing unit 1100 and the carrier 1525 may be bolted together, or the variable device coupling end portion and the carrier 1525 may be coupled to each other by a tooth-meshing structure.

The spring reaction force variable device 1500 is coupled to the rod portion 1120 of the bearing unit 1100, and the torsion spring 1400 may apply torque to the rod portion 1120 according to driving of the motor 1510. Furthermore, the spring reaction force variable device 1500 is configured to provide torque to an end portion of the crank 1200 formed to be integrated with the rod portion 1120, the end portion being coupled to the push rod 1300. Furthermore, when torque is applied to the spring reaction force variable device 1500 through the rod portion 1120, the spring reaction force variable device 1500 is configured to rotate the carrier 1525 to achieve torque balance between the applied torque, reaction force of the spring reaction force variable device 1500, and reaction torque of the torsion spring 1400. Accordingly, the crank 1200 may be rotated integrally with the push rod 1300 in the height direction of the vehicle in response to the driving amount and driving frequency of the motor 1510 of the spring reaction force variable device 1500.

Figure 2:
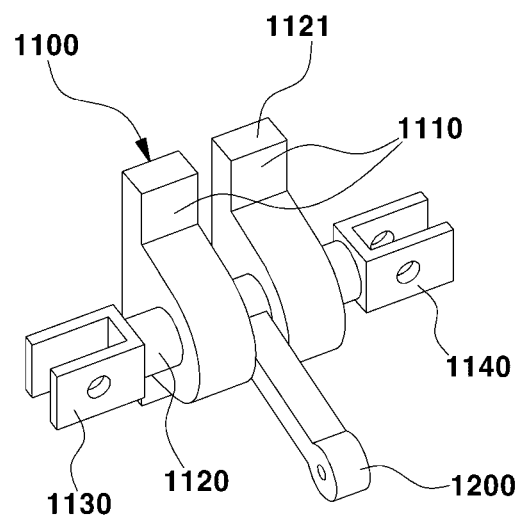
FIG. 2 is a diagram illustrating a bearing unit of the vehicle height control system according to the exemplary embodiment of the present disclosure.

FIG. 2 is an enlarged view of the bearing unit 1100 according to the exemplary embodiment of the present disclosure. As illustrated in the drawing, the bearing unit 1100 includes the bearing case 1110 coupled to a vehicle body, and the bearing case 1110 is located so that the rod portion 1120 is provided to penetrate the bearing case 1110 in the longitudinal direction of the vehicle. Furthermore, the bearing case 1110 through which the rod portion 1120 passes may include a support bearing configured to support the rod portion 1120.

Furthermore, the vehicle height control system includes the crank 1200 fixed to the rod portion 1120 and located in the width direction of the vehicle. Accordingly, the other far end portion of the crank 1200 may be moved in the height direction of the vehicle in response to the rotation amount of the rod portion 1120. The crank 1200 is coupled to the central area between the support bearings located on the rod portion 1120, and the other end portion of the crank 1200 is moved integrally with the rod portion 1120 in the height direction in response to the rotation amount of the rod portion 1120. The arm 1000 and the wheel 2000 are moved integrally in response to the movement of the crank 1200 in the height direction thereof.

The opposite end portions of the rod portion 1120 are respectively coupled to the torsion spring 1400 and the carrier 1525 of the spring reaction force varying device 1500. The torsion spring 1400 may be located in parallel to the rod portion 1120 in the same direction, and the torsion spring 1400 may be fixed to the rod portion 1120 through the spring coupling portion 1130 located at one end portion of the rod portion 1120.

The other end portion of the rod portion 1120 includes the variable device coupling portion 1140 configured to allow the carrier 1525 of the spring reaction force variable device 1500 to be coupled to the other end portion of the rod portion 1120. That is, the driving torque of the motor 1510, the reaction torque of the torsion spring 1400, and the reaction torque applied from the spring reaction force variable device 1500 are transmitted to the crank 1200 through the rod portion 1120. Furthermore, the torque applied through the crank 1200 and the reaction torque of the torsion spring 1400 are applied to the spring reaction force variable device 1500 through the rod portion 1120.

The torsion spring 1400 and the carrier 1525 respectively coupled to the opposite end portions of the rod portion 1120 may be fixed to the rod portion 1120 through bolt fastening. Alternatively, a meshing gear may be provided at each of the opposite end portions of the spring coupling portion 1130 and the variable device coupling portion 1140, and each of the torsion spring 1400 and the carrier 1525 may include a structure corresponding to the meshing gear formed in each of the spring coupling portion 1130 and the variable device coupling portion 1140 to be meshed with each other.

That is, the rod portion 1120 is coupled to the torsion spring 1400 and the spring reaction force variable device 1500 so that torque applied from each of the torsion spring 1400 and the spring reaction force variable device 1500 is transmitted to the crank 1200.

Figure 3:
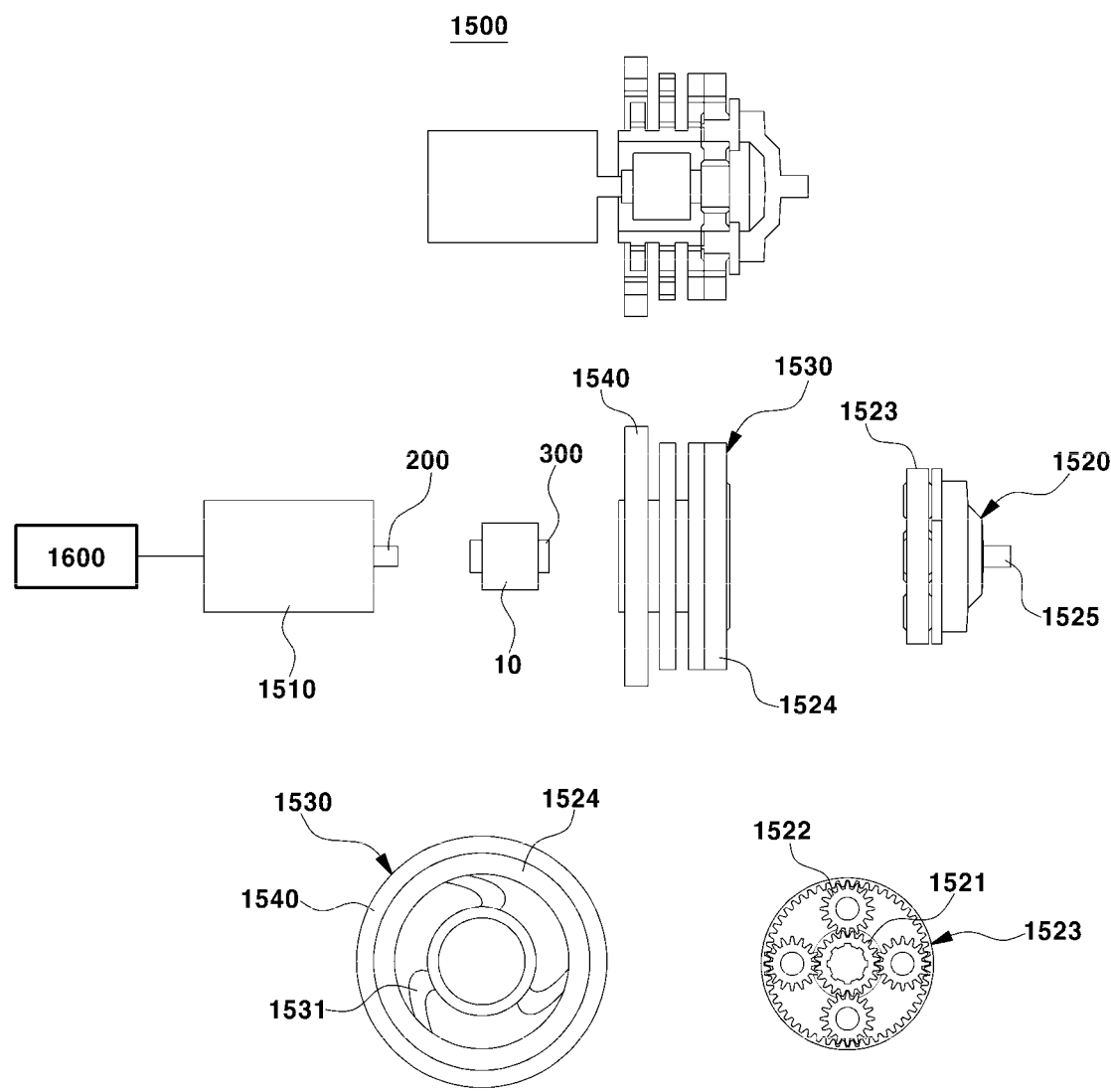
FIG. 3 is a diagram illustrating a detailed configuration of a spring reaction force variable device of an independent corner module according to the exemplary embodiment of the present disclosure.

FIG. 3 is a diagram illustrating the configuration of the spring reaction force variable device 1500 according to the exemplary embodiment of the present disclosure.

The spring reaction force variable device 1500 is fixed to the vehicle body, and the carrier 1525 of the spring reaction force variable device 1500 is coupled to one end portion of the rod portion 1120 of the bearing unit 1100. Furthermore, the spring reaction force variable device 1500 includes the motor 1510 configured to apply torque, a clutch unit 10 coupled to an output shaft of the motor 1510, and a reducer 1520 coupled to the output end portion 300 of the clutch unit 10.

The reducer 1520 is rotated in response to torque applied from the output end portion 300 of the clutch unit 10 coupled to the reducer 1520. Furthermore, a spring portion 1530 is provided between the vehicle body and the outside of the reducer 1520. That is, the spring portion 1530 has one end portion coupled to a ring gear 1523 located at the edge portion of the reducer 1520 and the other end portion fixed to the vehicle body. Furthermore, the spring portion 1530 is configured to apply reaction torque applied between the vehicle body and the ring gear 1523 to the carrier 1525 of the reducer 1520.

That is, torque applied from the motor 1510 is transmitted to the reducer 1520 through the clutch unit 10, and the reducer 1520 is configured to determine the location of the carrier 1525 of the reducer 1520 based on resultant force of elastic force applied from the spring portion 1530. Therefore, a positional relationship between components forming the reducer 1520 is set to achieve torque balance between the reducer 1520, the carrier 1525, the motor 1510, and the rod portion 1120 coupled to the carrier 1525.

According to the exemplary embodiment of the present disclosure, the reducer 1520 is formed of a planetary gear set, and the same includes a sun gear 1521 coupled to the output end portion 300 of the clutch unit 10 and located at the center portion thereof, and a ring gear 1523 configured to surround the outermost portion of the planetary gear set. Furthermore, a plurality of planetary gears 1522 located between the ring gear 1523 and the sun gear 1521 are provided. The external surface of the planetary gear set includes the carrier 1525, coupled to the planetary gear 1522 and rotated integrally with the planetary gear 1522, and the carrier 1525 is coupled to the rod portion 1120 of the bearing unit 1100. The carrier 1525 is inserted into the center portion of the planetary gear 1522 and is rotated integrally with the planetary gear 1522, and the carrier 1525 may be located substantially on the same axis as the output end portion 300 of the clutch unit 10.

That is, while torque is applied to the sun gear 1521 from the output end portion 300 of the clutch unit 10 and the planetary gear 1522 is rotated in the opposite direction to the sun gear 1521 in response to rotation of the sun gear 1521, the carrier 1525 is rotated in the same direction as the sun gear 1521 between the ring gear 1523 and the sun gear 1521. Furthermore, when the planetary gear 1522 is rotated integrally with the carrier 1525 as described above, the ring gear 1523 is configured to rotate at a predetermined angle with respect to the vehicle body, and an elastic portion 1531 of the spring portion 1530 is configured to provide reaction torque to the ring gear 1523 rotating with respect to a frame 1540.

The spring portion 1530 includes the frame 1540 fixed to the vehicle body, and the same is coupled to a ring gear fixing portion 1524 located on the ring gear 1523 of the reducer 1520. When the ring gear 1523 is rotated, the elastic portion 1531 located between the frame 1540 and the ring gear fixing portion 1524 is configured to provide reaction torque between the frame 1540 and the ring gear 1523 in response to the rotation amount of the ring gear 1523. Accordingly, the reaction torque applied through the spring portion 1530 in response to the rotation amount of the ring gear 1523 may be relatively increased.

When the motor 1510 is rotated to drive the sun gear 1521, the elastic portion 1531 is configured to apply reaction torque to the ring gear 1523 in response to the rotation amount of the ring gear 1523. Conversely, when the motor 1510 is not rotated, the elastic portion 1531 may provide reaction torque in response to the rotation amount between the ring gear 1523 and the frame 1540 by external torque applied to the carrier 1525. That is, the elastic portion 1531 provides reaction torque in the opposite direction to the external torque introduced into the carrier 1525 to achieve torque balance of external torque introduced into the spring reaction force variable device 1500.

The elastic portion 1531 may include one or more elastic portions 1531 having different spring constants corresponding to the deformation amount and reaction torque, and as various exemplary embodiments of the present disclosure, the elastic portion 1531 may include a torsional spring, a coil spring, and the torsion spring 1400. Moreover, the elastic portion 1531 may be formed of a combination of one or more different spring types.

Figure 4A:
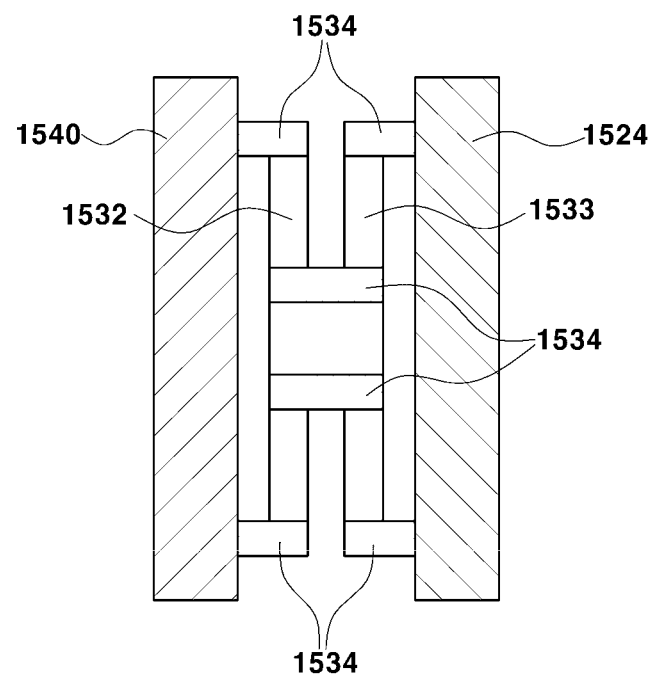
FIG. 4A is a diagram illustrating a configuration of a spring portion of the vehicle height control system according to the exemplary embodiment of the present disclosure.

FIG. 4A illustrates, as various exemplary embodiments of the present disclosure, a configuration in which a first elastic portion 1532 and a second elastic portion 1533 forming the elastic portion 1531 are coupled to each other in series to apply reaction torque to the ring gear 1523.

As illustrated in the drawing, the frame 1540 is fixedly located so as not to be rotated, and includes the first elastic portion 1532 located adjacent to the frame 1540. The first elastic portion 1532 is coupled to the frame 1540 through a spring connection portion 1534 located in the frame 1540. In the exemplary embodiment of the present disclosure, the spring connection portion 1534 may be coupled to the edge portion of the first elastic portion 1532.

Furthermore, the second elastic portion 1533 located adjacent to the ring gear 1523 is provided. The second elastic portion 1533 is coupled to the ring gear fixing portion 1524 through the spring connection portion 1534. The spring connection portion 1534 may be located adjacent to the edge portion of the second elastic portion 1533 coupled to the ring gear 1523.

Furthermore, the first elastic portion 1532 and the second elastic portion 1533 may include the spring connection portion 1534 to be coupled to each other at a location adjacent to the central area. That is, the first elastic portion 1532 and the second elastic portion 1533 are connected in series.

Therefore, when the motor 1510 is driven, the ring gear 1523 is rotated by rotation force applied to the sun gear 1521 coupled to the output end portion 300 of the clutch unit 10, and the frame 1540 and the ring gear fixing portion 1524 are switched to a relatively twisted state, and reaction torque of the elastic portion 1531 is generated.

Furthermore, when the motor 1510 is not driven, the output end portion 300 of the clutch unit 10 is fixed to limit the rotation of the sun gear 1521, and reaction torque of the elastic portion 1531 coupled to the ring gear fixing portion 1524 and external torque of a load applied to the carrier 1525 are applied to the reducer 1520. In the instant case, the elastic portion 1531 provides reaction torque in a direction opposite to the twisting direction. Accordingly, the carrier 1525 is rotated by an angle relatively smaller than the amount of torque applied from the outside thereof to achieve torque balance.

Figure 4B:
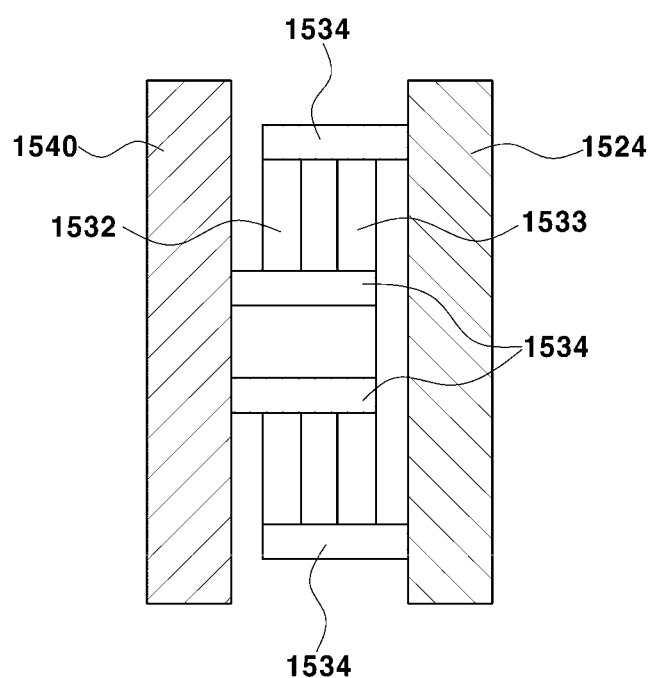
FIG. 4B is a diagram illustrating another configuration of the spring portion of the vehicle height control system according to the exemplary embodiment of the present disclosure.

FIG. 4B illustrates, as another exemplary embodiment of the present disclosure, a configuration in which the first elastic portion 1532 and the second elastic portion 1533 forming the elastic portion 1531 are coupled in parallel to each other to apply reaction torque to the ring gear 1523.

As illustrated in the drawing, the elastic portion 1531 includes the first elastic portion 1532 located adjacent to the frame 1540 and the second elastic portion 1533 located adjacent to the side surface of the ring gear 1523. The first elastic portion 1532 and the second elastic portion 1533 are coupled to each other by the spring connection portion 1534 formed to extend from the side of the ring gear 1523. The spring connection portion 1534 located on the side of the ring gear 1523 is coupled to the edge portion areas of the first elastic portion 1532 and the second elastic portion 1533.

Furthermore, the spring connecting portion 1534 formed to extend from the frame 1540 may be fixedly located at the central areas of the first elastic portion 1532 and the second elastic portion 1533.

In another exemplary embodiment of the present disclosure, the elastic portion 1531 is configured to apply reaction torque between the ring gear 1523 and the frame 1540 when the motor 1510 is driven and the motor 1510 is not driven, making it possible to achieve, according to the driving relationship, torque balance between torque applied to the carrier 1525, torque generated by driving the sun gear 1521, and reaction torque applied to the ring gear 1523 through the elastic portion 1531.

Figure 4C:
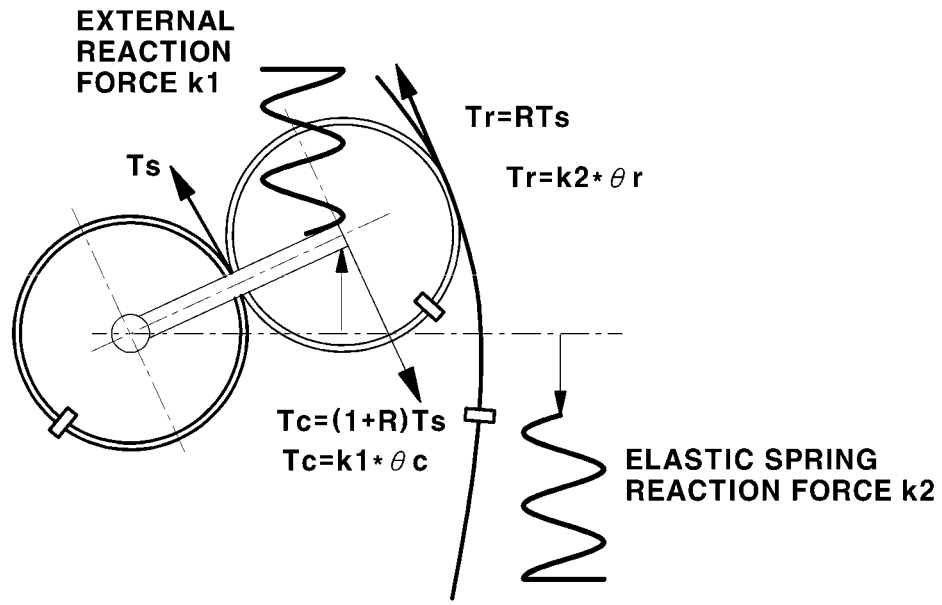
FIG. 4C is a diagram illustrating a driving relationship in which torque balance is achieved when a motor is driven according to the exemplary embodiment of the present disclosure.

FIG. 4C is a diagram illustrating a mechanism configured to achieve torque balance in response to a driving input of the motor 1510.

The control unit 1600 is configured to apply power to the motor 1510, and when the output shaft of the motor 1510 is rotated, the clutch unit 10 coupled to the output shaft of the motor 1510 is rotated integrally with the motor 1510. The reducer 1520 coupled to the output end portion 300 of the clutch unit 10 is configured to rotate the carrier 1525 by driving force of the output end portion 300 of the clutch unit 10.

The sun gear 1521 coupled to the output end portion 300 of the clutch unit 10 is rotated in the same direction as the output end portion 300 of the clutch unit 10, and each of the planetary gears 1522 located to be engaged with the sun gear 1521 is rotated in the opposite direction to the sun gear 1521.

Furthermore, each of the planetary gears 1522 moves between the sun gear 1521 and the ring gear 1523, and the central axis of the planetary gear 1522 is configured to move in the same direction as the rotation direction of the sun gear 1521. Furthermore, the carrier 1525, formed to protrude from the external surface to be connected to the planetary gear 1522 and coupled to a load, is rotated in the same direction as the movement direction of the central axis of the planetary gear 1522 and the rotation direction of the sun gear 1521.

Additionally, when the ring gear 1523 is rotated relative to the frame 1540 in response to the movement of the planetary gear 1522, torsional force is applied to the spring portion 1530 located between the frame 1540 and the ring gear 1523. Accordingly, the elastic portion 1531 of the spring portion 1530 is configured to apply reaction torque to the ring gear 1523 in response to relative torsion between the frame 1540 and the ring gear fixing portion 1524.

Here, FIG. 4C illustrates a balance relationship after torque balance is achieved between the outputs of the carrier 1525 coupled to the outside in response to the input of the motor 1510, the reducer 1520, and the motor 1510.

As illustrated in the drawing, torque of the sun gear 1521 acts counterclockwise when the motor 1510 is driven, and reaction torque of the spring portion 1530 coupled to the ring gear 1523 acts in the same direction as the torque of the sun gear 1521. Conversely, reaction torque or torque applied from the carrier 1525 acts clockwise. Therefore, in torque balance, the sum of the torque of the motor 1510 and the reaction torque of the spring portion 1530 is in balance with the torque of the sun gear 1521.

That is, when force applied from the motor 1510 to the sun gear 1521 is determined as Ts and reaction torque of the spring portion 1530 is applied in a state in which the ring gear 1523 in torque balance is fixed, torque Tc applied to the carrier 1525 is determined by multiplying 1+R (where R is the radius of the ring gear/the radius of the sun gear) by the force Ts applied to the sun gear 1521. Furthermore, reaction torque Tr of the ring gear 1523 has R*Ts.

As described above, as illustrated in the drawing, when torque balance is achieved in response to the input of the motor 1510, Tc=Tr+Ts is obtained, and when reaction torque is applied in a state in which the ring gear 1523 is fixed, a torque balance state including a value of Tc=(1+R)*Ts is achieved.

Figure 4D:
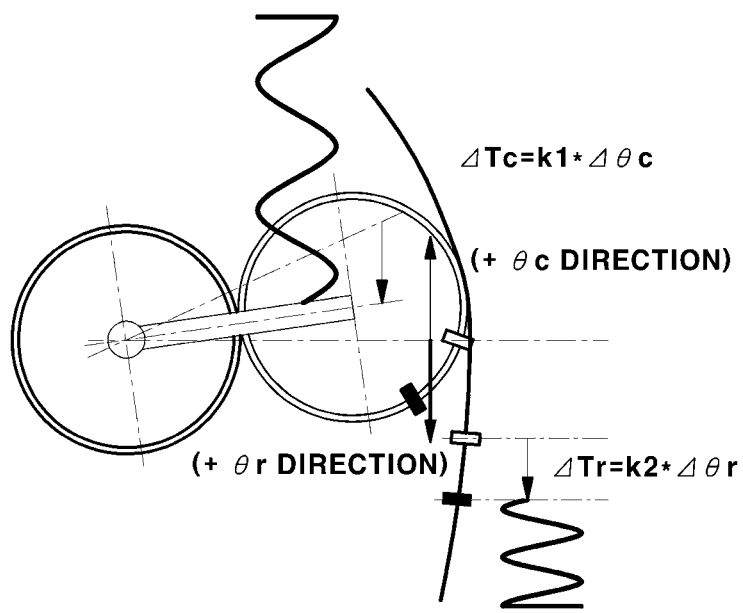
FIG. 4D is a driving relationship in which torque balance is achieved when the motor is not driven according to the exemplary embodiment of the present disclosure.

As various exemplary embodiments of the present disclosure, FIG. 4D illustrates movement to achieve an balance state, when driving force of the motor 1510 is released, between the reaction torque Tc of the carrier 1525 through the spring reaction force variable device 1500 and the reaction torque Tr applied from the outside of the spring reaction force variable device 1500 in a state in which rotation of the output end portion 300 of the clutch unit 10 is limited.

Here, the driving force of the motor 1510 is released, and torque applied to the sun gear 1521 is 0, which means a torque balance state between the reaction torque of the spring portion 1530 and the torque applied to the carrier 1525.

As illustrated in the drawing, in the state in which the driving of the motor 1510 of the spring reaction force variable device 1500 is released, the output end portion 300 coupled to the sun gear 1521 is switched to a state in which driving torque is not applied from the motor 1510. Accordingly, torque Tc of the carrier 1525 applied counterclockwise in the drawing is generated, and reaction torque Tr applied through the spring portion 1530 of the spring reaction force variable device 1500 is applied. Here, reaction torque applied from the outside of the spring reaction force variable device 1500 may include all external factors affecting the spring reaction force variable device 1500 through the carrier 1525.

That is, when the input torque of the motor 1510 is converted to 0 after torque Ts of the motor 1510 is applied, the sun gear 1521 is fixed by the clutch unit 10, and the carrier 1525 connected to the planetary gear 1522 is rotated to obtain an equilibrium state between Tc and Tr. For example, in the relationship of Tc>Tr, a relationship is established in which the carrier 1525 is rotated counter-clockwise in the drawing and restored by the reaction torque Tc, and Tr applied by the spring portion 1530 increases. Here, in the torque balance relationship of the total planetary gears 1522, new torque Tc_new of the carrier 1525 and new torque Tr_new of the spring portion 1530 are determined and represented as Tc_new=Tr_new in the balanced state.

That is, Ts torque to be applied when the motor 1510 is driven in FIG. 4C becomes 0, and the Ts torque is configured to achieve a new balanced state through torque applied to the spring portion 1530 and torque output through the carrier 1525. Accordingly, torque Ts/2 is applied to each of the spring portion 1530 and the carrier 1525. In response to the torque Ts/2 applied thereto, a positional relationship of the ring gear 1523 coupled to the carrier 1525 and the spring portion 1530 is adjusted.

Wherein the Tc=θc×K1 and Tr=θr×K2

Additionally, according to a relationship between elastic modulus K2 of the spring portion 1530 and elastic modulus K1 applied to the carrier 1525, the carrier 1525 and the planetary gear 1522 are moved to a new balanced position to be rotated clockwise in the drawing.

That is, the control unit 1600 may be configured to determine the rotation amount (angle) of the carrier 1525 and the planetary gear 1522 that achieve a new torque balance after driving of the motor 1510 is stopped, and to set the driving frequency of the motor 1510 based on the determined rotation amount. Furthermore, the control unit 1600 may set the driving frequency of the motor 1510 based on the rotation amount of the carrier 1525 rotated in response to each driving of the motor 1510, making it possible to determine the rotation amount of the carrier 1525.

According to the exemplary embodiment of the present disclosure, the control unit 1600 applies driving force of the motor 1510 as illustrated in FIG. 4C, is configured to determine the rotation amount of the carrier 1525 by performing the step in FIG. 4D to obtain new torque balance based on the applied driving force, and repeatedly performs, based on the determined rotation amount, the steps in FIGS. 4C and 4D to correspond to the predetermined rotation amount of the carrier 1525.

Figure 5A:
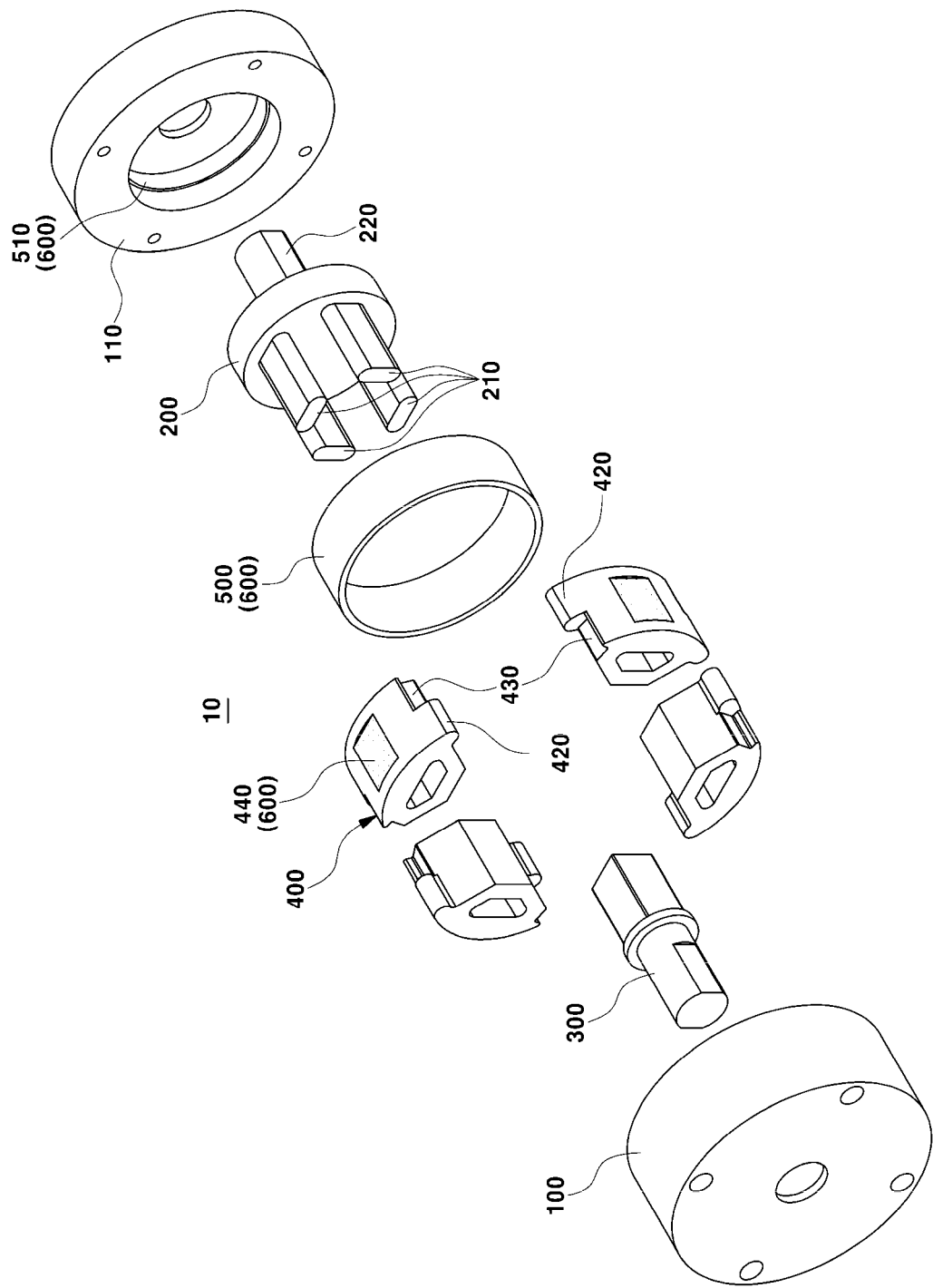
FIG. 5A is a diagram illustrating a configuration of a clutch unit of the vehicle height control system according to the exemplary embodiment of the present disclosure.

FIG. 5A is a diagram illustrating a configuration relationship of the clutch unit 10 according to the exemplary embodiment of the present disclosure.

As illustrated in the drawing, the clutch unit 10 includes a housing 100 and a cover portion 110 disposed at one end portion of the housing 100 and configured to cover the open end portion of the housing 100. The housing 100 includes a circular cross section, and the cover portion 110 is configured to completely cover the opening of one end portion of the housing 100.

The clutch unit 10 further includes an output end portion 300 configured to penetrate the other end portion of the housing 100 and formed to have at least one flat surface. The housing 100 includes a plurality of lockers 400 disposed therein and configured to surround the flat surface of the output end portion 300 and a motor output shaft 200 disposed therein, the motor output haft 200 including one end portion inserted into an opening 410 located in each locker 400. The output end portion 300 includes the number of flat surfaces corresponding to the number of lockers 400 located inside the housing 100. The output end portion 300 in an exemplary embodiment of the present disclosure may have four flat surfaces corresponding to the four lockers 400. Furthermore, the plurality of flat surfaces located at the output end portion 300 are respectively in contact with the plurality of adjacent lockers 400 when torque of the motor output shaft 200 is applied. Accordingly, the surfaces of the lockers 400 and the flat surfaces of the output end portion 300 may selectively contact with each other.

The motor output shaft 200 includes a rotation transmission portion 210 disposed at one end portion thereof and partially inserted into the opening 410 located in each locker 400 in the longitudinal direction and a driving transmission portion 220 disposed at the other end portion thereof and formed to penetrate the cover portion 110 to protrude outwards from the cover portion 110. The driving transmission portion 220 is coupled to a driving portion configured to apply torque to be rotated integrally with the rotation direction of the driving portion.

Furthermore, torque of the driving portion is applied to the driving transmission portion 220 located at the other end portion of the motor output shaft 200, and driving force applied to the driving transmission portion 220 is configured to rotate the output end portion 300 through the rotation transmission portion 210. The driving portion is configured to transmit driving force capable of rotating the motor output shaft 200, and the surfaces of the plurality of lockers 400 are respectively in contact with the flat surfaces of the output end portion 300 in response to the torque of the motor output shaft 200. According to the exemplary embodiment of the present disclosure, the driving portion coupled to the motor output shaft 200 may be formed of the motor 1510.

The motor output shaft 200 includes the rotation transmission portion 210 inserted into the opening 410 formed in each of the lockers 400. Here, the motor output shaft 200 includes four rotation transmission portions 210 corresponding to the four lockers 400 in the exemplary embodiment of the present disclosure. Each of the rotation transmission portions 210 may maintain a state of being inserted into each of the openings 410 formed in the plurality of lockers 400. Additionally, the rotation transmission portion 210 is rotated in the same direction as the rotation direction of the driving transmission portion 220, and the locker 400 in contact with the rotation transmission portion 210 through the opening 410 is rotated integrally with the rotation transmission portion 210 in response to the rotation direction of the motor output shaft 200.

A braking unit 600 located inside the housing 100 of the clutch unit 10 is configured to regulate movement of the plurality of lockers 400 when torque of the output end portion 300 is applied to the inside of the clutch unit 10, and the torque of the output end portion 300 is not transmitted to the motor output shaft 200. The braking unit 600 in an exemplary embodiment of the present disclosure includes a magnetic portion 440 located on the outermost side of the locker 400, a steel portion 500 located on the internal circumferential surface of the housing 100 and disposed at a location corresponding to the magnetic portion 440, and a braking portion 510 disposed adjacent to the steel portion 500 and configured to selectively contact with the locker 400.

The plurality of lockers 400 are located inside the housing 100, and each flat surface of the output end portion 300 and each locker 400 may be located adjacent to each other. The plurality of lockers 400 are divided into at least two pieces, and each locker 400 is disposed to include a predetermined gap between the flat surface of the output end portion 300 and the housing 100. The number of flat surfaces of the output end portion 300 may be the same as the number of lockers 400 so that the internal surface of each locker 400 is located adjacent to the flat surface of the output end portion 300.

Furthermore, when the torque of the motor output shaft 200 is applied, the internal end portion of the locker 400 may contact with the flat surface formed on the output end portion 300, and the locker 400 may be spaced from the internal circumferential surface of the housing 100 with a predetermined distance so that the motor output shaft 200, the locker 400, and the output end portion 300 are integrally rotated without interference with the internal circumferential surface of the housing 100.

The housing 100 includes the steel portion 500 disposed on the internal circumferential surface thereof, and at least one locker 400 includes the magnetic portion 440 disposed on the external circumferential surface thereof. Accordingly, when the torque of the motor output shaft 200 is released, the magnetic portion 440 of the locker 400 may be moved to a location close to the internal circumferential surface of the housing 100. Furthermore, the braking unit 600 includes the braking portion 510 disposed adjacent to the steel portion 500 and located close to the internal circumferential surface of the housing 100. Accordingly, the external circumferential surface of the locker 400 is moved to a location in contact with the braking portion 510 by magnetic force to limit the movement of the motor output shaft 200.

Furthermore, when the torque of the output end portion 300 is applied, the flat surfaces formed on the output end portion 300 push the plurality of lockers 400 in the radial direction so that the braking portion 510 located on the internal circumferential surface of the housing 100 and the external circumferential surfaces of the lockers 400 contact with each other to be fixed to each other. Therefore, it is possible to prevent the torque of the output end portion 300 from being transmitted to the motor output shaft 200. The braking portion 510 may be formed at a location closer to the locker 400 than to the steel portion 500, making it possible to prevent the magnetic portion 440 of the locker 400 from directly contacting with the steel portion 500.

The locker 400 and the internal circumferential surface of the housing 100 may be configured to form a predetermined gap therebetween according to the location of the locker 400. Therefore, in a state in which driving force of the motor output shaft 200 is released, the external circumferential surface of the locker 400 is moved to a location adjacent to the internal circumferential surface of the housing 100 by magnetic force of the magnetic portion 440, and a distance between the internal circumferential surface of the housing 100 and the external circumferential surface of the locker 400 becomes minimized.

Conversely, when the motor output shaft 200 is rotated, the rotation transmission portion 210 of the motor output shaft 200 may be located to contact one end portion in the width direction of the opening 410 of the locker 400, and torque may be applied to rotate each locker 400 in the torque direction of the driving portion. In the instant case, the plurality of lockers 400 are located to respectively contact with the flat surfaces of the output end portion 300, and the distance between the internal circumferential surface of the housing 100 and the external circumferential surface of the locker 400 is switched to the maximum state. Accordingly, the locker 400 is located in response to the rotation of the motor output shaft 200 to tightly contact with the surface of the output end portion 300 (that is, the surface of the output end portion 300 is constrained) without generating reaction force with the housing 100.

As described above, the clutch unit 10 in an exemplary embodiment of the present disclosure is configured so that, in response to the motor output shaft 200 configured to rotate in a direction consistent with the rotation direction applied from the driving portion, the locker 400 is spaced from the internal circumferential surface of the housing 100 and is rotated integrally with the output end portion 300. Furthermore, when the torque applied to the motor output shaft 200 is released, the braking portion 510 and the locker 400 contact with each other to limit the movement of the motor output shaft 200, preventing back drive of the motor.

Figure 5B:
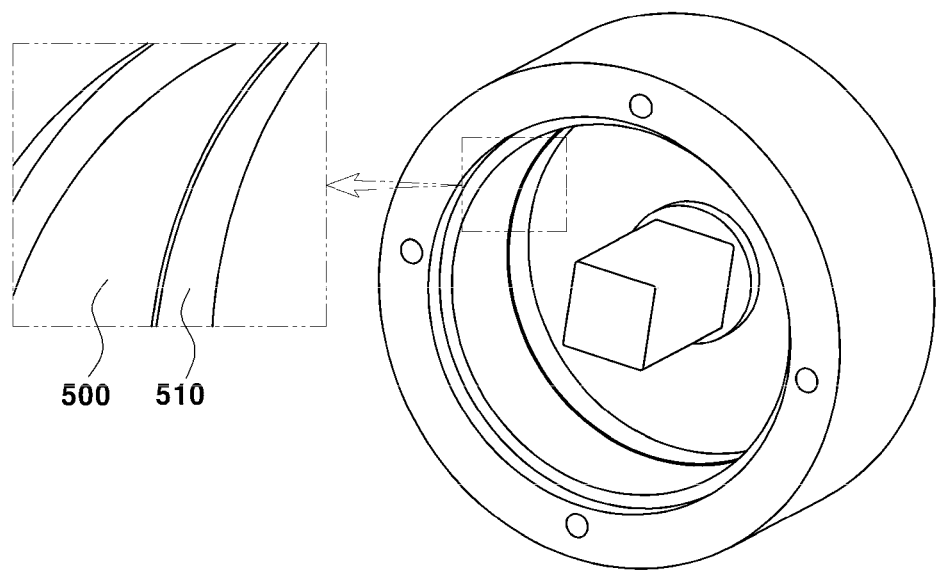
FIG. 5B is an enlarged view of a braking portion and a steel portion of the clutch unit according to the exemplary embodiment of the present disclosure.

FIG. 5B is a diagram illustrating a configuration of the steel portion 500 located on the internal circumferential surface of the housing 100 and the braking portion 510 located adjacent to the steel portion 500.

The steel portion 500 is located on the internal circumferential surface of the housing 100 to correspond to the magnetic portions 440 respectively located on the external circumferential surfaces of the plurality of lockers 400. Therefore, when the torque of the motor output shaft 200 is released, the locker 400 is moved to a location adjacent to the steel portion 500 of the housing 100 by magnetic force. At the same time, the external surface of the locker 400 may contact with the braking portion 510 to limit the movement of the locker 400 and the motor output shaft 200.

Furthermore, the braking portion 510 located adjacent to the steel portion 500 may be located closer to the center portion of the housing 100 than the steel portion 500. Accordingly, when the locker 400 is moved to a location adjacent to the steel portion 500 in response to magnetic force, the external surface of the locker 400 is configured to contact with the braking portion 510.

As illustrated in the drawing, the exemplary embodiment of the present disclosure may include the braking portion 510 having a predetermined step with the steel portion 500, and the braking portion 510 may be located at at least a portion of the opposite end portions of the housing 100 in the longitudinal direction with respect to the steel portion 500. The exemplary embodiment of the present disclosure may include the braking portion 510 located on at least a portion of the steel portion 500 in the longitudinal direction and configured to surround the internal circumferential surface of the housing 100.

Therefore, when the locker 400 is moved to a location closest to the internal circumferential surface of the housing 100, the magnetic portion 440 and the steel portion 500 are configured to maintain a non-contact state and to provide reaction force in a state in which the braking portion 510 and the locker 400 contact with each other.

Figure 5C:
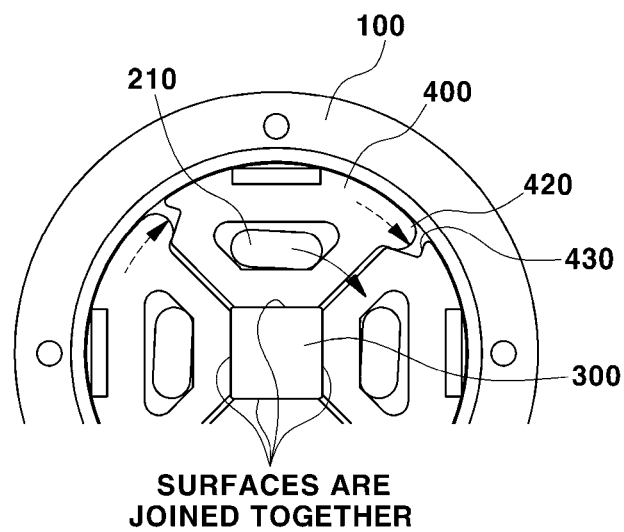
FIG. 5C is a diagram illustrating driving force applied to a locker in a state in which driving force of a motor output shaft is applied according to the exemplary embodiment of the present disclosure.
Figure 5D:
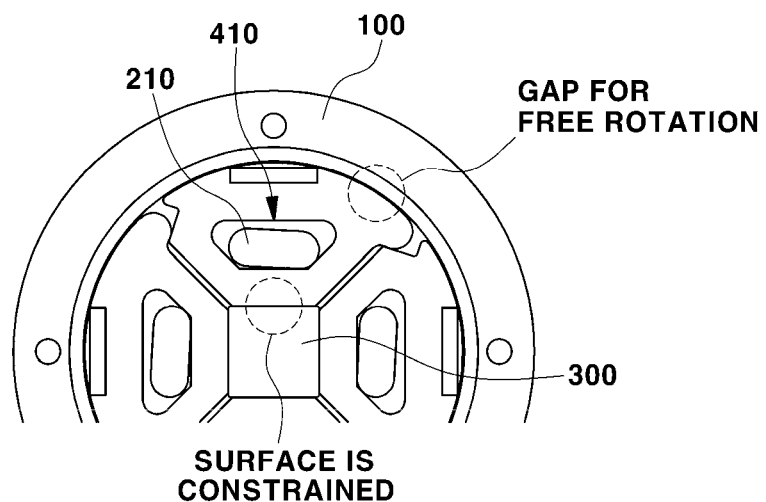
FIG. 5D illustrates a block diagram of the clutch unit in a state in which the driving force of the motor output shaft is applied according to the exemplary embodiment of the present disclosure.
Figure 5E:
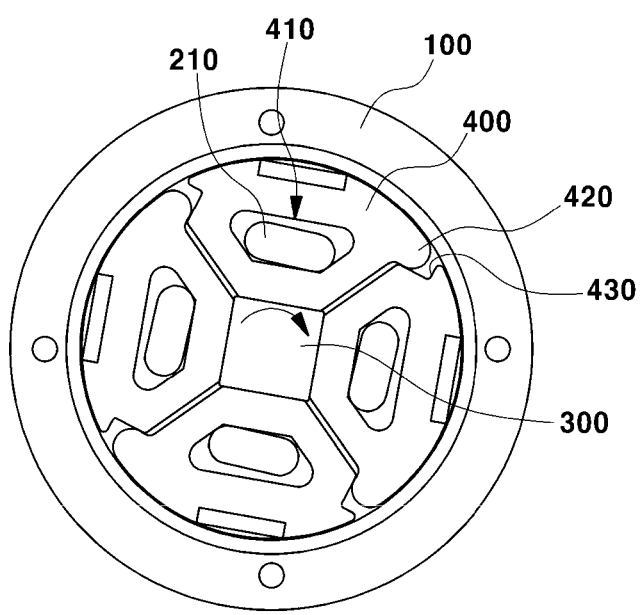
FIG. 5E illustrates an operation diagram in which an output end portion thereof is rotated in a state in which the driving force of the motor output shaft is applied according to the exemplary embodiment of the present disclosure.

FIGS. 5C to 5E are diagrams illustrating a configuration in which torque of the motor output shaft 200 is applied and the motor output shaft 200 is rotated integrally with the locker 400 and the output end portion 300.

As illustrated in FIG. 5C, the motor 1510 is configured as a driving portion and is coupled to the driving transmission portion 220 of the motor output shaft 200, and when torque of the motor 1510 is applied to the motor output shaft 200, the rotation transmission portions 210 of the motor output shaft 200 respectively located at the openings 410 of the locker 400 are configured to initially press the openings 410 in the rotation direction of the motor output shaft 200.

The pressurized openings 410 respectively move the plurality of lockers 400 so that the external surfaces of the lockers 400 are spaced from the braking portion 510 of the housing 100, and accordingly, the plurality of lockers 400 are spaced from the internal circumferential surface of the housing 100 and switched to the rotatable state.

The opening 410 includes a trapezoidal shape, the long side surface of which is formed close to the external circumferential surface of the housing 100. Furthermore, the inclined side surface of the trapezoidal shape is pressed by rotation force of the rotation transmission portion 210. Force is applied to the locker 400 in a tangential direction in which the inclined side surface and the rotation transmission portion 210 contact with each other. The force applied to the inclined side surface is formed of a resultant force including a vertical force by which the locker 400 constrains the flat surface of the output end portion 300 and a horizontal force by which the locker 400 is rotated.

Furthermore, as illustrated in the drawing, in the exemplary embodiment of the present disclosure including four lockers 400, the rotation transmission portions 210 respectively inserted into the openings 410 are rotated in the same direction, and each of the rotation transmission portions 210 contacts with a corresponding one of the end portions of the openings 410 to apply rotation force to the lockers 400 in the same direction.

Furthermore, the locker 400 includes a pressure protrusion 420 located at one end portion of the locker 400, the pressure protrusion 420 being located at one end portion of the side surface of the locker 400, the one end portion being close to the internal circumferential surface of the housing 100. Furthermore, the locker 400 including the pressing protrusion 420 includes an insertion groove 430 configured to allow the pressure protrusion 420 to be inserted into the adjacent locker 400. The pressure protrusion 420 is located to cross the insertion groove 430 in the longitudinal direction, and in the lockers 400 adjacent to each other, the insertion groove 430 corresponding to the pressure protrusion 420 and the pressure protrusion 420 corresponding to the insertion groove 430 are respectively formed, allowing the adjacent lockers 400 to be coupled to each other.

The plurality of lockers 400 including the pressure protrusion 420 and the insertion groove 430 are configured so that the respective lockers 400 are mutually coupled to each other. Accordingly, when the locker 400 is moved adjacent to the internal circumferential surface of the housing 100 by the magnetic portion 440 located on the outermost side of at least one locker 400, all the lockers 400 mutually coupled to each other may be integrally moved.

Furthermore, when rotation force of the rotation transmission portion 210 is applied, the pressure protrusion 420 applies force to the adjacent locker 400 in a direction in which the adjacent lockers 400 respectively contact with the flat surfaces of the output end portion 300. In the exemplary embodiment of the present disclosure, when the motor output shaft 200 is rotated, each surface of the output end portion 300 including four flat surfaces and each surface of the lockers 400 are configured to contact with each other.

Therefore, when the opening 410 of the locker 400 is pressed by the rotation transmission portion 210, the pressure protrusion 420 of the locker 400 is inserted into the insertion groove 430 of the adjacent locker 400 to be coupled to each other. That is, the pressure protrusion 420 presses the surface of the adjacent insertion groove 430, and the locker 400, the surface of which is pressed by the pressure protrusion 420, is configured to move the adjacent lockers 400 in a direction of contacting with a plurality of parallel surfaces of the output end portion 300.

In the present manner, when the motor output shaft 200 is rotated, the locker 400 presses the lockers 400 adjacent to each other to apply force in the same direction as the rotation direction thereof. Furthermore, the locker 400 includes the pressure protrusion 420 and the insertion groove 430 to press the adjacent locker 400 so that the flat surface of the output end portion 300 and the internal surface of the adjacent locker 400 contact with each other.

As illustrated in FIG. 5D, the locker 400 contacts with the flat surface of the output end portion 300 so that the surface of the output end portion 300 is constrained by the locker 400, and when the surfaces of at least some of the lockers 400 adjacent to each other contact with the output end portion 300, the flat surfaces of the output end portion 300 are located to be in contact with the plurality of lockers 400. Furthermore, the internal circumferential surface of the housing 100 and the external circumferential surface of the locker 400 are configured to be spaced from each other.

Therefore, torque applied to the rotation transmission portion 210 of the motor output shaft 200 is transmitted to the locker 400 and the output end portion 300 without interference with the internal circumferential surface of the housing 100.

As illustrated in FIG. 5E, the motor output shaft 200, the plurality of lockers 400, and the output end portion 300 are integrally rotated according to the torque of the motor output shaft 200.

Accordingly, the torque of the motor output shaft 200 is transmitted to the output end portion 300 corresponding to clockwise rotation in the drawing.

In the present manner, when driving of the motor 1510 is applied, as illustrated in FIG. 4C, rotational torque of the motor output shaft 200 is applied to the sun gear 1521, and torque balance is achieved by the applied torque of the sun gear 1521, the reaction torque of the spring portion 1530, and the external torque applied from the rod portion 1120 to the carrier 1525.

Figure 6:
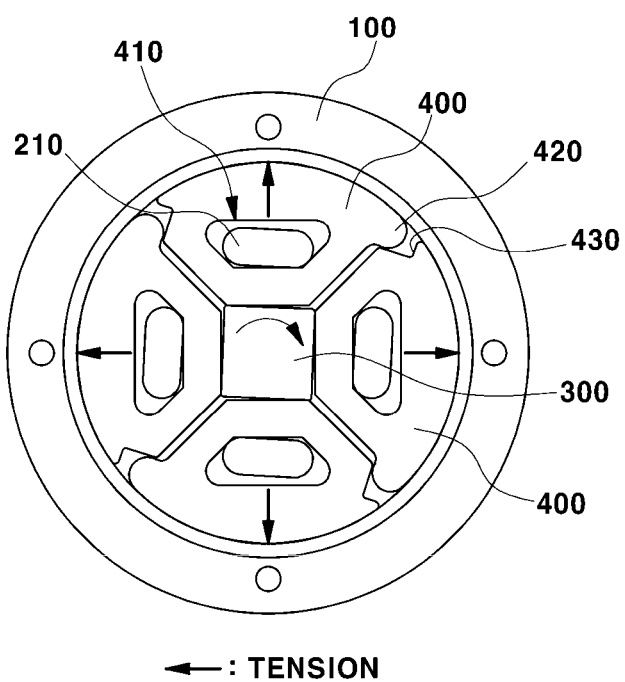
FIG. 6 illustrates a schematic diagram of the clutch unit in a state in which driving force of the output end portion thereof is applied according to the exemplary embodiment of the present disclosure.

FIG. 6 illustrates a driving relationship of the clutch unit 10 when torque is applied to the output end portion 300 in a state in which the torque of the motor output shaft 200 is released.

As illustrated in the drawing, when the output end portion 300 is rotated, force is provided to push the locker 400 located adjacent to the output end portion 300 in the radial direction of the housing 100, and the locker 400 is configured to limit rotation thereof by contacting with the braking portion 510 located on the internal circumferential surface of the housing 100.

That is, torque by the torque applied to the output end portion 300 applies force to move the locker 400 in the radial direction of the housing 100, and the locker 400 and the braking portion 510 are configured to contact with each other according to the applied force. Moreover, the movement of the locker 400 is limited through magnetic force formed between the magnetic portion 440 and the steel portion 500 as well as the torque of the output end portion 300. Therefore, the torque applied to the output end portion 300 is offset by reaction force formed between the braking portion 510 and the locker 400, and the torque introduced from the output end portion 300 is not transmitted to the motor output shaft 200.

That is, when the sun gear 1521 is rotated to apply torque to the clutch unit 10, the locker 400 configured to surround the output end portion 300 is located to contact with the braking portion 510 so that the torque of the output end portion 300 is not transmitted to the motor output shaft 200.

As described above, when the motor 1510 is not driven, the torque applied to the clutch unit 10 through the output end portion 300 of the clutch unit 10 is not applied to the motor output shaft 200 by the braking portion 510. Therefore, as illustrated in FIG. 4D, the torque applied to the reducer through the motor 1510 and the torque transmitted from the reducer to the motor 1510 become 0, and new torque balance is achieved based on the reaction force of the spring portion 1530 located in the reducer and the reaction force applied to the rod portion 1120 coupled to the carrier. Furthermore, the planetary gear 1522 and the carrier 1525 are moved to a location at which the new torque balance is achieved, and the load portion 1120 is rotated in response to the rotation amount (rotation angle) of the carrier 1525, performing control of the vehicle height.

As is apparent from the above description, the present disclosure may obtain the following effects by the above-described configuration, coupling, and use relationship.

Various aspects of the present disclosure are directed to providing a vehicle control system configured to control vehicle height by adjusting input torque of a separate spring reaction force variable device depending on the load state of a vehicle, making it possible to reliably control the vehicle height when a load difference is large.

Furthermore, the amount of motor driving of the spring reaction force variable device and the number of times thereof are controlled to adjust suspension characteristics of a vehicle body generated depending on the driving state of the vehicle, including an effect of simultaneously improving driving stability and ride comfort of the vehicle.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle height control system comprising:
an arm including a first end portion connected to a vehicle body and a second end portion coupled to a wheel;
a bearing unit fixed to the vehicle body;
a crank coupled to the bearing unit;
a push rod including a first end portion connected to the crank and a second end portion connected to the arm; and a spring reaction force variable device coupled to the bearing unit and configured to vary reaction force applied to the crank, wherein the spring reaction force variable device further includes:
   a motor configured to provide torque;
   a clutch unit connected to an output shaft of the motor;
   a reducer located at an output end portion of the clutch unit and coupled to the crank; and
   a spring portion coupled to the reducer, and
wherein reaction torque of the spring portion is varied by driving the motor.

2. The vehicle height control system of claim 1, wherein, in the spring reaction force variable device, in response that the motor is driven, motor torque is applied to the reducer coupled to the output end portion so that the motor torque on the reducer, the reaction torque of the spring portion, and load torque by an external load applied to the reducer through the crank are balanced, and in response that the motor is not driven, the reaction torque and the load torque are balanced.

3. The vehicle height control system of claim 1, wherein the clutch unit rotates only when the torque of the motor is input through the output shaft of the motor.

4. The vehicle height control system of claim 1, wherein the reducer is formed of a planetary gear set, and
   wherein the planetary gear set includes:
      a sun gear coupled to the output end portion of the clutch unit;
      a ring gear fixed to the spring portion;
      a plurality of planetary gears located and engaged between the sun gear and the ring gear; and
      a carrier including a first end portion connected to the planetary gears and a second end portion connected to the bearing unit.

5. The vehicle height control system of claim 4, wherein the spring portion further includes:
   a frame fixed to the vehicle body;
   an elastic portion including a first end portion fixed to the frame; and
   a ring gear fixing portion to which a second end portion of the elastic portion is fixed and to which the ring gear is coupled.

6. The vehicle height control system of claim 5, wherein the elastic portion includes:
   a first elastic portion located adjacent to the frame; and
   a second elastic portion located adjacent to the ring gear.

7. The vehicle height control system of claim 6, further including a spring connection portion connecting the first elastic portion and the second elastic portion in series or in parallel to each other.

8. The vehicle height control system of claim 5, wherein the ring gear fixing portion is coupled to an edge portion of the elastic portion, and the frame is coupled to a central area of the elastic portion.

9. The vehicle height control system of claim 1, wherein the bearing unit includes:
   a bearing case fixed to the vehicle body;
   a rod portion formed to be integrated with the crank and supported by the bearing case;
   a spring coupling portion located at a first end portion of the rod portion and coupled to a torsion spring; and
   a variable device coupling portion located at a second end portion of the rod portion and coupled to the spring reaction force variable device.

10. The vehicle height control system of claim 9, wherein the bearing case further includes a support bearing configured to rotatably support the rod portion.

11. The vehicle height control system of claim 9, wherein the torsion spring and the spring coupling portion are coupled to each other through a tooth-meshing structure or a bolt fastening structure.

12. The vehicle height control system of claim 9, wherein an output end portion of the spring reaction force variable device and the variable device coupling portion are coupled to each other through a tooth-meshing structure or a bolt fastening structure.

13. A vehicle height control system comprising:
   an arm including a first end portion connected to a vehicle body and a second end portion coupled to a wheel;
   a bearing unit fixed to the vehicle body;
   a crank coupled to the bearing unit;
   a push rod including a first end portion connected to the crank and a second end portion connected to the arm;
   a spring reaction force variable device coupled to the bearing unit and configured to vary reaction force applied to the crank; and
   a control unit electrically connected to the spring reaction force variable device and configured to perform, in response that a measured vehicle height exceeds a preset vehicle height range, driving of the spring reaction force variable device,
wherein the spring reaction force variable device further includes:
   a motor configured to provide torque;
   a clutch unit connected to an output shaft of the motor;
   a reducer located at an output end portion of the clutch unit and coupled to the crank; and
   a spring portion coupled to the reducer, and
wherein reaction torque of the spring portion is varied by driving the motor.

14. The vehicle height control system of claim 13, wherein the control unit is configured to perform driving of the motor in response that the measured vehicle height exceeds the preset vehicle height range.

15. The vehicle height control system of claim 14, wherein the control unit is configured to determine an amount of change in the vehicle height according to each driving of the motor, and to set a number of times of the driving of the motor based on the determined amount of change in the vehicle height.

16. The vehicle height control system of claim 14, wherein the control unit is configured to convert a target control amount of the vehicle height into a target rotation amount of the carrier and to drive the motor so that the carrier is rotated up to a target location.

17. The vehicle height control system of claim 13,
   wherein the reducer is formed of a planetary gear set, and
   wherein the planetary gear set includes:
      a sun gear coupled to the output end portion of the clutch unit;
      a ring gear fixed to the spring portion;
      a plurality of planetary gears located and engaged between the sun gear and the ring gear; and
      a carrier including a first end portion connected to the planetary gears and a second end portion connected to the bearing unit.

18. The vehicle height control system of claim 13, wherein the bearing unit includes:
   a bearing case fixed to the vehicle body;
   a rod portion formed to be integrated with the crank and supported by the bearing case;

a spring coupling portion located at a first end portion of the rod portion and coupled to a torsion spring; and a variable device coupling portion located at a second end portion of the rod portion and coupled to the spring reaction force variable device.

* * * * *